United States Patent
Iseki et al.

(10) Patent No.: US 7,217,346 B2
(45) Date of Patent: *May 15, 2007

(54) WATER TREATING METHOD, WATER TREATING APPARATUS, AND HYDROPONICS SYSTEM USING THE APPARATUS

(75) Inventors: Masahiro Iseki, Ota (JP); Yasuhito Kondo, Ora-gun (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 527 days.

This patent is subject to a terminal disclaimer.

(21) Appl. No.: 10/305,430

(22) Filed: Nov. 27, 2002

(65) Prior Publication Data

US 2003/0121798 A1      Jul. 3, 2003

(30) Foreign Application Priority Data

Nov. 30, 2001    (JP)    ............................. 2001-366926

(51) Int. Cl.
   *C02F 1/46*    (2006.01)

(52) U.S. Cl. ................... 204/228.1; 204/228.6; 204/229.4; 204/275.1; 204/276

(58) Field of Classification Search ............. 204/228.1, 204/228.6, 229.4, 275.1, 276
See application file for complete search history.

(56) References Cited

U.S. PATENT DOCUMENTS

| 5,314,589 A | * | 5/1994 | Hawley ...................... 205/618 |
| 5,744,028 A | * | 4/1998 | Goto et al. ................. 210/181 |
| 6,045,704 A | * | 4/2000 | Sato et al. .................. 210/694 |

* cited by examiner

*Primary Examiner*—Arun S. Phasge
(74) *Attorney, Agent, or Firm*—Armstrong, Kratz, Quintos, Hanson & Brooks, LLP.

(57) ABSTRACT

There is provided a water treating method which can not only improve an effect of eliminating microorganisms in water intended for cooking and drinking or waste water but also prevent a reduction in trace amounts of nutritional elements. In the method, at least a pair of carbon fibers capable of collecting at least microorganisms are immersed in for-treatment water, potentials of opposite polarities are applied to the carbon fibers, and the polarities of the potentials are switched at a predetermined time interval so as to adsorb the microorganisms on the carbon fibers. After the microorganisms are adsorbed, a positive potential is applied to one of the carbon fibers, and a negative potential is applied to the other so as to cause electrolysis. Then, an alternating voltage is applied to the carbon fibers so as to heat the for-treatment water and the carbon fibers.

9 Claims, 5 Drawing Sheets

WATER TREATING METHOD, WATER TREATING APPARATUS, AND HYDROPONICS SYSTEM USING THE APPARATUS

BACKGROUND OF THE INVENTION

1. Field of the Invention

The present invention relates to a method and apparatus for sterilizing water (water to be treated) (hereinafter, "water to be treated" will be referred to as "for-treatment water") such as water used for drinking and cooking or waste water discharged from hydroponics and to a hydroponics system using the apparatus.

2. Description of the Related Art

Heretofore, for example, to remove microorganisms such as bacteria, fungi and protozoans contained in water intended for drinking and cooking such as tap water reserved in a reservoir, a method has been employed in which a porous filter material capable of collecting these microorganisms is placed in a water channel so as to make the microorganisms stick to the filter material and thereby purify the water.

Further, in addition to this, there is also a method in which chlorine and ozone are produced by electrolysis caused by electrodes immersed in water intended for drinking and cooking and microorganisms contained in the water are eliminated by sterilizing effects of the produced chlorine and ozone.

Meanwhile, in hydroponics, a solution prepared by dissolving a fertilizer in water in an amount suitable for cultivation of crops is circulated through a cultivation bed so as to suitably grow crops planted in the cultivation bed. However, the inside of the cultivation bed through which the fertilizer solution is circulated is an environment suitable for proliferation of pathogenic bacteria such as Fusarium (a type of fungi), and if the Fusariums are proliferated in the cultivation bed, they damage roots of the crops and cause the crops to die. Accordingly, in this case as well, a means for killing or decreasing pathogenic bacteria in the fertilizer solution is needed.

Meanwhile, such a filter material as described above collects microorganisms by receiving them in fine pores formed on its surface. Therefore, unless the microorganisms collide with or pass by the surface of the filter material, they cannot be stuck to the filter material. Thus, the effect of causing the microorganisms to stick to the filter material is limited.

Microorganisms are generally negatively charged (reference: "Basic and Application Technique of Electrolyte" authored by Masaki Matsuo, published by Gihodo Syuppan. For reference purposes, some microorganisms are positively charged.) Thus, when the filter material is composed of, for example, carbon fibers which are conductive materials and a positive potential is applied to the carbon fibers, microorganisms can be attracted to the carbon fibers so as to be collected thereby.

However, when a positive potential is applied to the carbon fibers, oxygen is produced on the surfaces of the carbon fibers by electrolysis, so that trace amounts of nutritional elements contained in for-treatment water such as manganese (Mn) and iron (Fe) are oxidized and precipitated and removed as manganese oxide, i.e., MnO, $Mn_2O_3$, $MnO_2$ or $Mn_2O_7$, and iron oxide, i.e., FeO or $Fe_2O_3$. Thus, particularly, when a fertilizer solution to be used in hydroponics is sterilized, the concentration of nutrients (minerals) contained in the fertilizer solution is reduced, thereby causing a problem that growth of plants is inhibited.

SUMMARY OF THE INVENTION

The present invention has been conceived to solve the technical problem of the prior art. An object of the present invention is to provide a water treating method and water treating apparatus which can improve an effect of removing microorganisms in water intended for drinking and cooking or waste water and also prevent a reduction in trace amounts of nutritional elements, and a hydroponics system using the apparatus.

That is, in a water treating method of the present invention, at least a pair of conductive materials capable of collecting at least microorganisms are immersed in for-treatment water, potentials of opposite polarities are applied to the conductive materials, and the polarities of the potentials are switched at predetermined time intervals so as to adsorb the microorganisms on the conductive materials.

Further, in the water treating method of the present invention, the polarities of the potentials applied to the conductive materials are switched at a time interval of 2 seconds to 1 minute.

Further, a water treating method of the present invention comprises a first treating step of immersing the conductive materials in a passage of the for-treatment water so as to adsorb the microorganisms on the conductive materials in accordance with the foregoing method of the present invention, a second treating step of stopping flow of the for-treatment water after completion of the first treating step and, with a positive potential being applied to one of the conductive materials and a negative potential being applied to the other conductive material, increasing the potentials applied to the conductive materials in the presence of the for-treatment water so as to cause electrolysis of the for-treatment water, and a third treating step of applying an alternating voltage between the conductive materials in the presence of the for-treatment water after completion of the second treating step.

Further, in the forgoing water treating method of the present invention, the for-treatment water is heated by means of a heater in the third treating step.

Further, a water treating apparatus of the present invention comprises at least a pair of conductive materials which are capable of collecting at least microorganisms and immersed in the for-treatment water, and a controller which controls application of potentials to the conductive materials, wherein the controller applies potentials of opposite polarities to the conductive materials and switches between the polarities of the potentials at predetermined time intervals so as to adsorb the microorganisms on the conductive materials.

Further, in the water treating apparatus of the present invention, the controller switches between the polarities of the potentials applied to the conductive materials at a time interval of 2 seconds to 1 minute.

Further, a water treating apparatus of the present invention comprises at least a pair of conductive materials which are capable of collecting at least microorganisms and immersed in a passage of for-treatment water, and a controller which controls application of potentials to the conductive materials and flow of the for-treatment water, wherein the controller performs a first treating step of applying potentials of opposite polarities to the conductive materials with the for-treatment water flowing and switching between the polarities of the potentials at predetermined time intervals so as to adsorb the microorganisms on the conductive materials, a second treating step of stopping flow of the for-treatment water after completion of the first treating step and, with a positive potential being applied to one of the conductive materials and a negative potential being applied to the other conductive material, increasing the potentials applied to the conductive materials in the presence of the for-treatment water so as to cause electrolysis of the for-treatment water, and a third treating step of applying an alternating voltage between the electrode and the conductive material in the presence of the for-treatment water after completion of the second treating step.

Further, in the water treating apparatus of the present invention, the controller switches between the polarities of the potentials applied to the conductive materials at a time interval of 2 seconds to 1 minute in the first treating step.

Further, in the water treating apparatuses of the present invention, a heater for heating the for-treatment water is provided, and the controller energizes the heater in the third treating step.

Further, in the water treating methods or water treating apparatuses of the present invention, chlorine and/or ozone are/is produced on one of the conductive materials, and active oxygen is produced on the other conductive material in the third treating step.

Further, a water treating method of the present invention comprises a first treating step of immersing the conductive materials in a passage of the for-treatment water so as to adsorb the microorganisms on the conductive materials in accordance with the foregoing method according to the first and second inventions, a second treating step of stopping flow of the for-treatment water after completion of the first treating step and, with a positive potential being applied to one of the conductive materials and a negative potential being applied to the other conductive material, increasing the potentials applied to the conductive materials in the presence of the for-treatment water so as to cause electrolysis of the for-treatment water, and a third treating step of heating the for-treatment water by means of a heater after completion of the second treating step.

Further, a water treating apparatus of the present invention comprises at least a pair of conductive materials which are capable of collecting at least microorganisms and immersed in a passage of for-treatment water, a heater for heating the for-treatment water, and a controller which can control application of potentials to the conductive materials and flow of the for-treatment water, wherein the controller performs a first treating step of applying potentials of opposite polarities to the conductive materials with the for-treatment water flowing and switching between the polarities of the potentials at predetermined time intervals so as to adsorb the microorganisms on the conductive materials, a second treating step of stopping flow of the for-treatment water after completion of the first treating step and, with a positive potential being applied to one of the conductive materials and a negative potential being applied to the other conductive material, increasing the potentials applied to the conductive materials in the presence of the for-treatment water so as to cause electrolysis of the for-treatment water, and a third treating step of heating the for-treatment water by energizing the heater after completion of the second treating step.

Further, in the water treating apparatuses of the present invention, one of the conductive materials is positioned over the other conductive material, the heater is disposed in a portion underneath the lower conductive material where for-treatment water flows in, and from the portion where the heater is disposed to a portion over the upper conductive material from which for-treatment water flows out, a bypassing path which allows for-treatment water to bypass the conductive materials is provided.

Further, in the water treating apparatuses of the present invention, a pump for carrying the for-treatment water from below to above the conductive materials is disposed in the bypassing path, and the controller operates the pump in the third treating step.

Further, in the water treating apparatuses of the present invention, the lower conductive material is inclined such that the angle of its bottom increases toward an inlet of the bypassing path.

Further, the water treating methods or water treating apparatuses of the present invention further comprise a treating step of discharging the for-treatment water in which the conductive materials are immersed after completion of the third treating step.

Further, in the water treating methods or water treating apparatuses of the present invention, the conductive materials are porous materials.

Further, in the water treating methods or water treating apparatuses of the present invention, the conductive materials comprise carbon fibers.

Further, in the water treating methods or water treating apparatuses of the present invention, the carbon fibers constituting the conductive materials contain a noble metal such as palladium, platinum, iridium, tantalum or gold, an oxide thereof or a mixture thereof.

Further, in the water treating methods or water treating apparatuses of the present invention, adsorbability reproducing treatment in which the surfaces of the conductive materials are eluted into the for-treatment water by electrolysis is carried out.

Further, a hydroponics system of the present invention is a system in which a fertilizer solution is supplied to a cultivation bed so as to cultivate plants. The system has a path which allows a secondary fertilizer solution discharged from the cultivation bed to re-circulate through the cultivation bed and also has the foregoing water treating apparatus disposed in the path.

DETAILED DESCRIPTION OF THE PREFERRED EMBODIMENT

Figure 1:
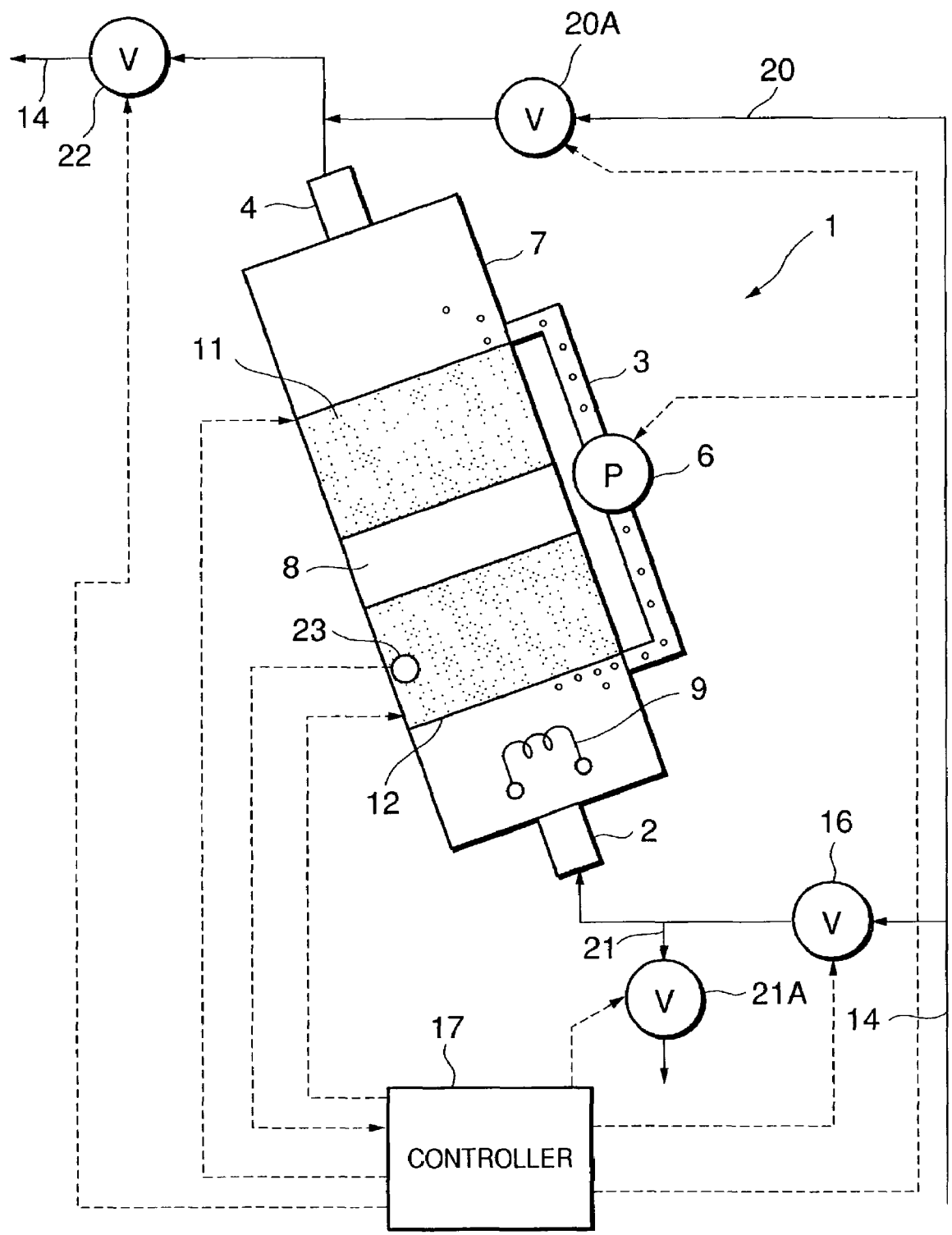
FIG. 1 is a block diagram of a water treating apparatus of an embodiment to which the present invention is applied.

Hereinafter, an embodiment of the present invention will be described in detail with reference to the drawings. FIG. 1 is a block diagram of a water treating apparatus 1 as an embodiment to which the present invention is applied. The water treating apparatus 1 comprises a case 7 which is in the shape of, for example, a cylinder and has an inlet 2 for introducing for-treatment water such as water intended for drinking and cooking which is reserved in a reservoir or waste water discharged from a hydroponics system at the lower end and an outlet 4 for discharging the for-treatment water at the upper end, water-permeable carbon fibers 11 and 12 as a pair of conductive materials disposed in the case 7 such that one of them is positioned over the other with a predetermined space therebetween and that there exists no space between them and the internal surface of the case 7, a porous insulator 8 which is disposed between the carbon fibers 11 and 12, and other components.

The case 7 is disposed such that it is inclined nearly 30° from a vertical axis. Further, a bypassing path 3 is provided on the external surface of the case 7 so as to communicate a portion underneath the carbon fibers 12 and a portion above the carbon fibers 11 in the case 7 to each other by bypassing the carbon fibers 11 and 12. The angle of the bottom of the carbon fibers 12 which are inclined due to the case 7 inclined as described above increases toward an inlet of the bypassing path 3. In addition, a pump 6 is disposed in the bypassing path 3. The pump 6 is operated so as to carry for-treatment water below the carbon fibers 12 to above the carbon fibers 11.

In addition, an electric heater 9 which comprises a sheathed heater is provided in the case 7, between the bottom of the carbon fibers 12 and the inlet 2 of the case 7. When electrolyzed, the heater 9 generates heat, thereby heating for-treatment water in the case 7.

Further, the inlet 2 and the outlet 4 are connected to a feed water system 14 such as a water pipe extending from a water reservoir. In the feed water system 14, a valve 16 is disposed near and upstream from the inlet 2, and a water flow valve 22 is also connected downstream from the outlet 4. Further, a bypass pipe 20 which bypasses the water treating apparatus 1 is also connected to the feed water system 14. The bypass pipe 20 is connected between a portion upstream from the valve 16 and a portion between the outlet 4 and the water flow valve 22, and a bypass valve 20A is provided in the bypass pipe 20.

Further, between the inlet 2 and the valve 16, a drain pipe 21 having a drainage valve 21A is connected, and an end of the drain pipe 21 is communicated with a drain ditch (not shown).

Reference numeral 17 denotes a controller which controls application of potentials to these carbon fibers 11 and 12, energization of the electric heater 9, operation of the pump 6, and opening and closing of the valve 16, bypass valve 20A, drainage valve 21A and water flow valve 22. Further, reference numeral 23 denotes a temperature sensor for sensing the temperature of the carbon fibers 12 (or for-treatment water in the case 7), and the temperature sensor 23 is connected to the controller 17.

The foregoing carbon fibers 11 and 12 each are a porous conductive material and serve as a filter for for-treatment water which flows through the water treating apparatus 1. Further, the carbon fibers 11 and 12 have a noble metal such as palladium (Pd), platinum (Pt), iridium (Ir), tantalum (Ta) or gold (Au), an oxide thereof or a mixture thereof coated at least on their surfaces.

With the foregoing arrangement, operations of the controller 17 will be described hereinafter. The water treating apparatus 1 is connected into, for example, the feed water system 14 for water intended for drinking and cooking as shown in FIG. 1. Further, the controller 17 is constituted by, for instance, a general-purpose microcomputer and performs treating steps to be described hereinafter in accordance with a predetermined program.

(1) First Treating Step

Firstly, the controller 17 closes the bypass valve 20A and the drainage valve 21A and opens the valve 16 and the water flow valve 22. Thus, for-treatment water flows into the case/of the water treating apparatus 1 from the inlet 2, reaches the carbon fibers 12, and passes through the carbon fibers 12. Then, the for-treatment water passes through the inside of the insulator 8, reaches the carbon fibers 11, passes through the carbon fibers 11, and then flows out from the outlet 4. As a result, the carbon fibers 11 and 12 are immersed in the for-treatment water.

Further, while the for-treatment water is passing through the carbon fibers 11 and 12, microorganisms such as bacteria and fungi contained in the for-treatment water are caught in fine pores formed on the surface of the carbon fibers 11 and 12 or caught and adsorbed due to affinity between the carbon fibers 11 and 12 and the microorganisms or a filtering effect of the carbon fibers 11 and 12.

Figure 2:
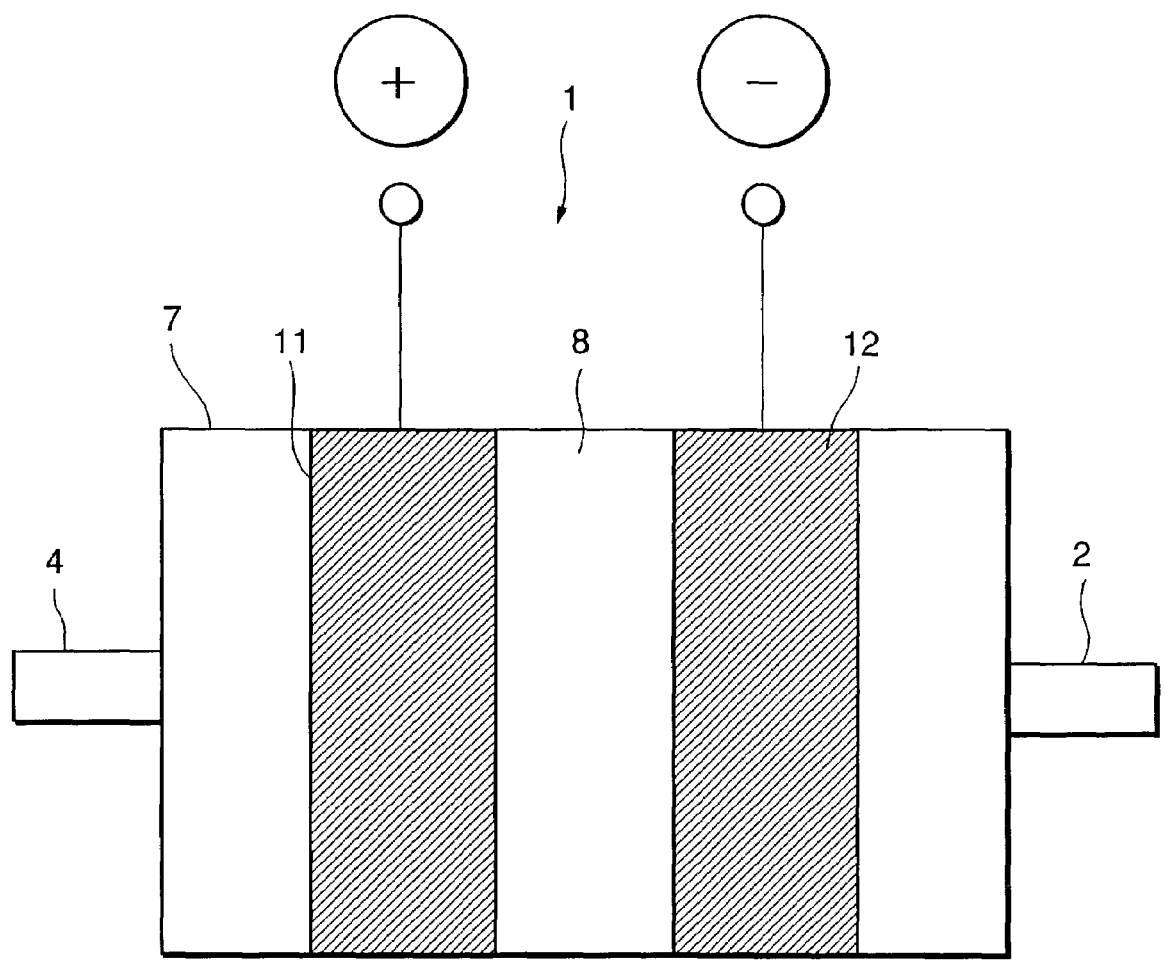
FIG. 2 is a diagram illustrating a state of the water treating apparatus of FIG. 1 when potentials are applied to carbon fibers in a first treating step.

Meanwhile, as shown in FIG. 2, the controller 17 applies a positive potential (+) to either of the carbon fibers 11 or 12 (for example, upper carbon fibers 11). Thereby, the potential of the carbon fibers 11 becomes positive. Meanwhile, a negative potential (−) is applied to the other (lower) carbon fibers 12. The potentials applied in this case are such potentials that do not cause vigorous electrolysis of the water and are determined according to quality of the for-treatment water and other factors. Further, it is assumed that the case 7 shown in FIG. 2 is filled with the for-treatment water.

Then, since microorganisms are generally negatively charged, the negatively charged microorganisms are attracted to the positively charged carbon fibers 11. Accordingly, negatively charged microorganisms flown into the carbon fibers 11 are attracted to the surfaces of the carbon fibers 11 and stuck in the fine pores smoothly and efficiently.

Further, although some microorganisms are positively charged, the positively charged microorganisms are attracted to the other negatively charged carbon fibers 12. Accordingly, positively charged microorganisms flown into the carbon fibers 12 are attracted to the surfaces of the carbon fibers 12 and stuck in the fine pores smoothly and efficiently.

Figure 3:
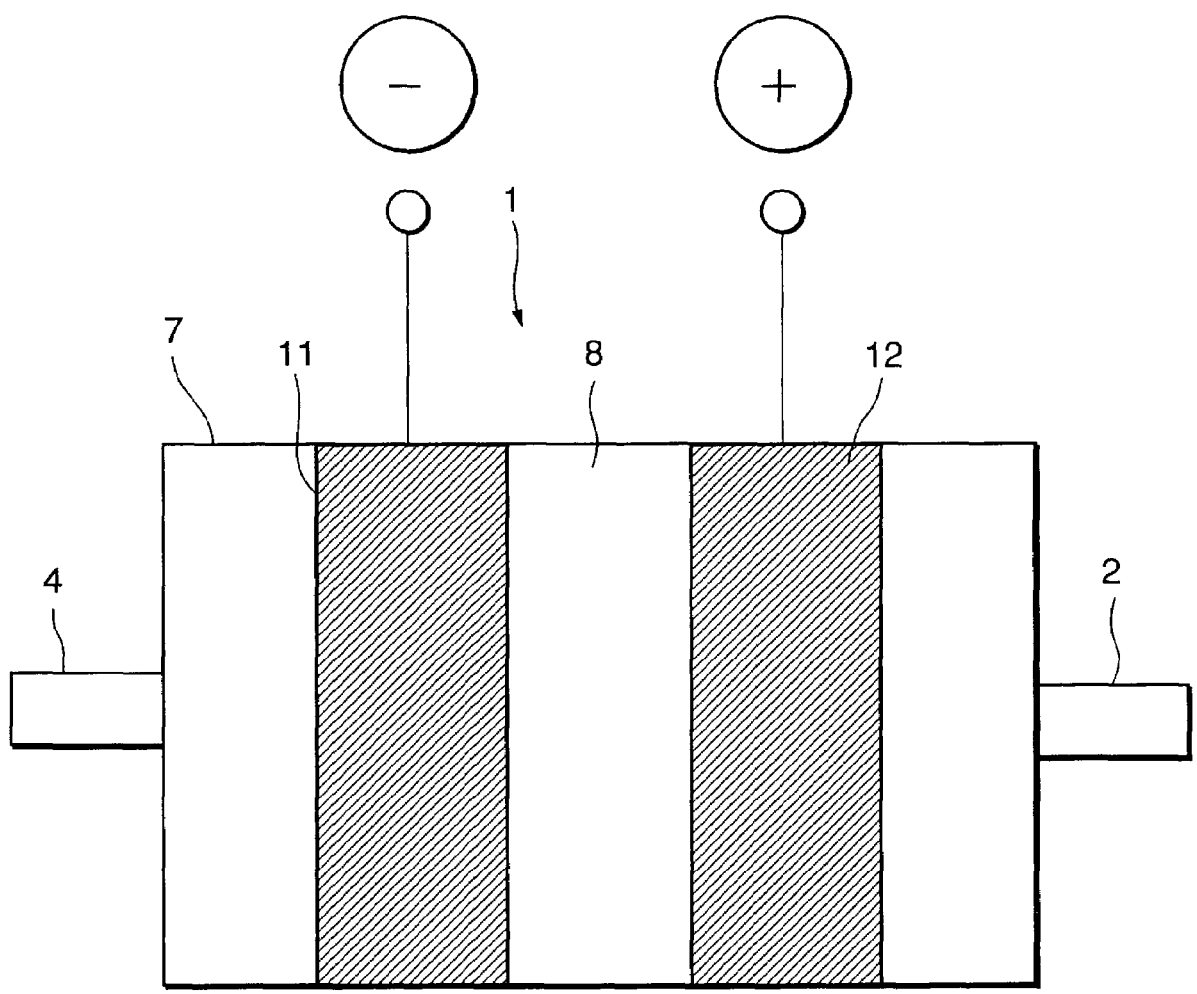
FIG. 3 is a diagram illustrating a state of the water treating apparatus of FIG. 1 when potentials are applied to the carbon fibers in the first treating step.

In addition, the controller 17 switches between the polarities of the potentials applied to the carbon fibers 11 and 12 at an interval of, for example, 2 seconds to 1 minute. More specifically, upon passage of 2 seconds to 1 minute from the start of energization, the controller 17 switches from the state shown in FIG. 2 to the state as shown in FIG. 3 in which a negative potential is applied to the carbon fibers 11 and a positive potential is applied to the carbon fibers 12. Then, upon passage of another 2 seconds to 1 minute, the controller 17 switches from the state shown in FIG. 3 to the application state shown in FIG. 2. The controller 17 repeats this cycle.

The for-treatment water contains trace amounts of nutritional elements such as manganese (Mn) and iron (Fe). These trace amounts of nutritional elements are formed into manganese oxide such as MnO, $Mn_2O_3$, $MnO_2$ or $Mn_2O_7$ or iron oxide such as FeO or $Fe_2O_3$ by oxygen which is inevitably produced on the surfaces of the positively charged carbon fibers 11 (or 12) by electrolysis and precipitated.

However, when the polarities of the potentials applied to the carbon fibers 11 and 12 are frequently switched at an interval of 2 seconds to 1 minute as in the present embodiment, the polarities are switched before these trace amounts of nutritional elements and oxygen are reacted with each other or in the initial stage of oxidation when they can be reduced. Thereby, an inconvenience that trace amounts of nutritional elements such as manganese and iron are removed from for-treatment water by applying potentials to the electrodes 11 and 12 can be prevented from occurring.

When the first treating step as described above is performed, for-treatment water which passes through the water treating apparatus 1 and flows out from the outlet 4 is clean water suitable for drinking and cooking from which microorganisms have been adsorbed on the carbon fibers 11 and 12 and removed. The first treating step is performed during a period during which water intended for drinking and cooking needs to be supplied (for example, during a period during which water is supplied with a tap opened, in the case of the water channel as in the present embodiment. In the case of a water reservoir as will be described later, the first treating step is performed during a predetermined period set by a timer).

Then, during a subsequent period during which the supply of the water intended for drinking and cooking is ceased (for example, in the present embodiment, a period during which the tap is being closed or a period during which the valve 16 and the water flow valve 22 are being closed by the controller 17), the controller 17 performs the second treating step.

(2) Second Treating Step

In the second treating step, the controller 17 closes the valve 16 and the water flow valve 22. Thereby, the for-treatment water remains (or is reserved) in the case 7 of the water treating apparatus 1. In this state, the controller 17 increases the potentials applied to the electrodes 11 and 12, with the polarities of the potentials applied to the electrodes 11 and 12 at the time of completion of the first treating step (in the following description, a positive potential is being applied to the carbon fibers 11, and a negative potential is being applied to the carbon fibers 12, for example) unchanged, so as to cause electrolysis of the for-treatment water. The potentials applied in this case are also determined according to quality of the for-treatment water and other factors.

When the potential of the carbon fibers 11 becomes positive with the for-treatment water remaining in the case 7 of the water treating apparatus 1, the pH of the for-treatment water in the vicinity of the surface of the carbon fibers 11 lowers to, for example, a pH of about 2 which indicates that the portion of the for-treatment water is acidic. Hence, since the optimal pH of the microorganisms is generally around a pH of 7, the microorganisms have metabolic disorder in the for-treatment water portion whose pH is off the optimal pH, whereby proliferation capability and heat resistance of the microorganisms are significantly degraded. Then, since the for-treatment water around the microorganisms stuck to the carbon fibers 11 as described above becomes acidic, the heat resistance of microorganisms which can normally endure a temperature of up to +80° C. or higher is significantly lowered. Thus, the for-treatment water is electrolyzed during a period during which supply of water intended for drinking and cooking is ceased (for example, in the present embodiment, a period during which a tap is being closed) so as to significantly displace the pH of the for-treatment water from the optimal pH of the microorganisms. Further, since hypochlorous acid is also produced in the second treating step, sterilization with the hypochlorous acid also takes place to a certain extent.

In the case of such a microorganism as a protozoan, modification and dissolution of proteins can lead to an improvement in treatment efficiency. When the potential of the carbon fibers 12 becomes negative, the pH of the for-treatment water in the vicinity of the surface of the carbon fibers 12 increases to, for example, a pH of about 11, indicating that the portion of the for-treatment water is alkaline. Hence, since the for-treatment water surrounding the microorganisms stuck to the carbon fibers 12 becomes alkaline, proteins of the microorganisms such as protozoans are modified and dissolved, so that resistances thereof are lowered. Thereby, a sterilizing effect in the third treating step to be performed subsequently to the second treating step is improved. After conducting the electrolysis of the for-treatment water in the second treating step for a predetermined time period, the controller 17 performs the third treating step.

(4) Third Treating Step

In the third treating step, the controller 17 applies an alternating voltage between the carbon fibers 11 and the carbon fibers 12. As a result, an electric current passes through the carbon fibers 11 and 12 and the for-treatment water therebetween, whereby the carbon fibers 11 and 12 and the for-treatment water generate heat. At this time, temperatures of the carbon fibers 11 and 12 and the for-treatment water increase to at least about +50° C. to +70° C. (+50° C. to +100° C.). Due to the increase in temperature which is caused by the heat generation, even microorganisms with reduced heat resistance which have stuck to the carbon fibers 11 and 12 in the first treating step and managed to survive the second treating step can be killed efficiently in the third treating step. Since the for-treatment water has been electrolyzed in the foregoing second treating step so as to decrease or increase the pH of the for-treatment water, even microorganisms which can normally endure a temperature of up to about +80° C. can be killed at low temperatures from about +50° C. to +70° C.

Figure 4:
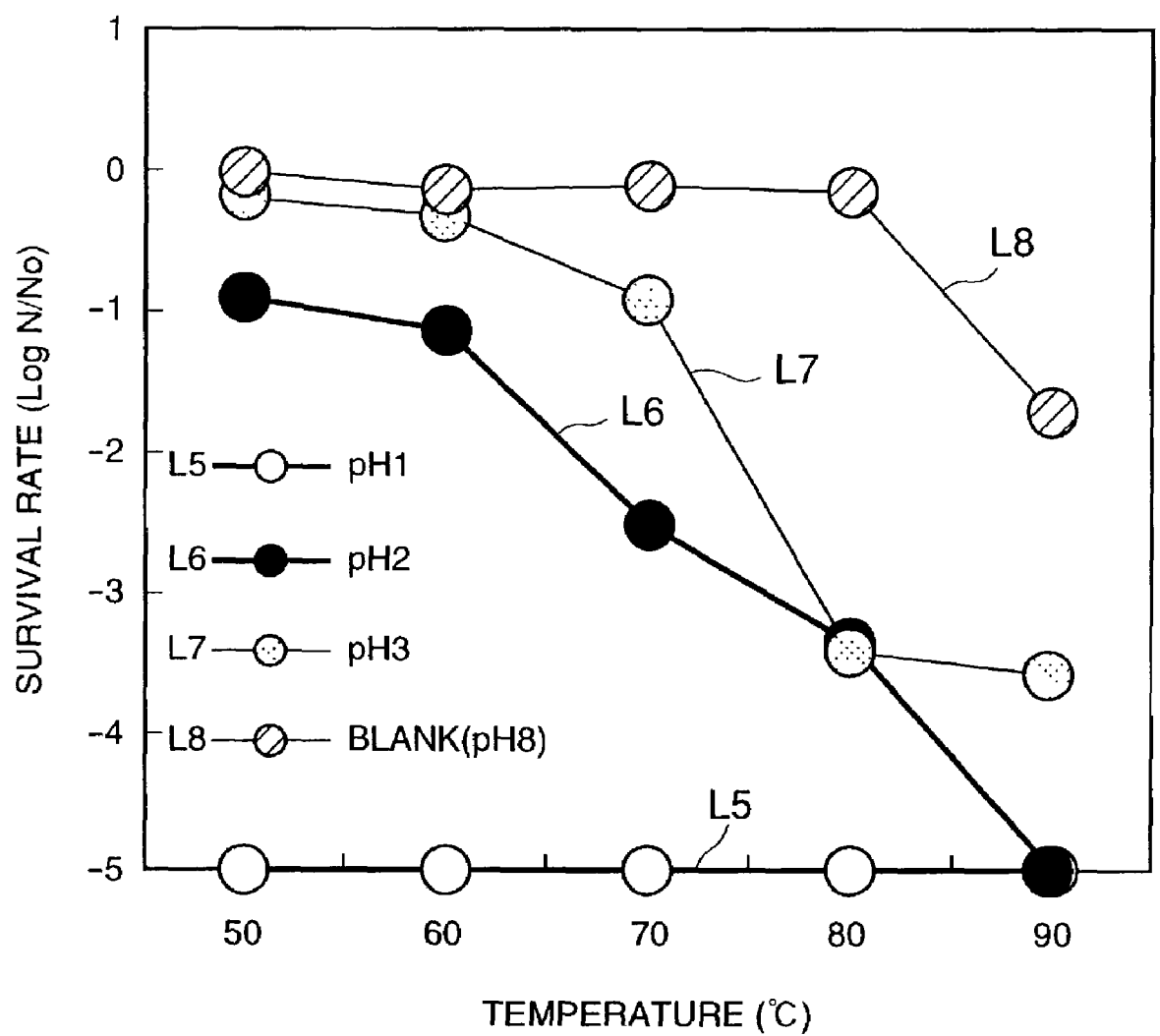
FIG. 4 is a diagram illustrating an effect of sterilizing spore forming bacteria by a pH and heating.

FIG. 4 shows the survival rate of spore forming bacteria by a pH and heating. The horizontal axis represents temperatures, and the experiment time is 30 minutes. In FIG. 4, L5 represents a survival rate at a pH of 1, L6 represents a survival rate at a pH of 2, L7 represents a survival rate at a pH of 3, and L8 represents a survival rate at a pH of 8. As is obvious from FIG. 4, it is understood that spore forming bacteria which can survive temperatures of +80° C. or higher at a pH of 8 are killed at temperatures from +50° C. to +60° C. at a pH of 2 to 3.

Further, electrolysis of the for-treatment water occurs at the carbon fibers 11 and 12 so as to be positively charged, and at the carbon fibers 11 (or 12) which serve as an anode, chlorine ions in the for-treatment water release electrons so as to generate chlorine (or hypochlorous acid). In addition, water molecules are also decomposed and bonded to oxygen atoms so as to generate ozone (reference: "Generation of Ozone by Electrolysis of Aqueous Solution", Soda and Chlorine, No. 5, 1998). Meanwhile, at the negatively charged carbon fibers 12 (or 11) which serve as a cathode, active oxygen (such as hydrogen peroxide) is generated (reference: SURFACE (Surface Conversation Party and Colloid Discussion Party), Vol. 34, No. 10, 1996).

Reaction formulas representing the aforementioned generation of chlorine and hypochlorous acid (HClO) at the anode and the process of rendering the for-treatment water alkaline are represented by the following (1) to (3).

$$NaCl \rightarrow Na^+ + Cl^- \tag{1}$$

$$2Cl^- \rightarrow Cl_2 + 2e^- \tag{2}$$

$$Cl_2 + H_2O \rightarrow HClO + HCl \tag{3}$$

When an alternating current is applied between the carbon fibers 11 and 12, the for-treatment water in the case 7 can be heated without having polarizations on the carbon fibers. Due to an increase in temperature of the for-treatment water in the case 7, microorganisms whose heat resistance has been lowered by the electrolysis can be killed more efficiently.

Meanwhile, when a direct current is applied between the carbon fibers 11 and 12 so as to cause them to generate heat, electrolysis of the water occurs in addition to the foregoing production of ozone, so that energy is consumed for the electrolysis as well as for the heat generation. In contrast, the application of the alternating current does not cause electrolysis of the water and can kill the microorganisms with a small consumption of electric power. As a result, a significant degree of energy conservation can be achieved, which is economically advantageous. Further, since the alternating current does not involve a chemical reaction, it is also expected that useful lives of the carbon fibers can be prolonged.

In this case, since the carbon fibers 11 and 12 contain a noble metal such as palladium, platinum, iridium, tantalum or gold or an oxide or mixture thereof, chlorine and/or ozone are/is vigorously produced at the anode, and active oxygen is vigorously produced at the cathode. These chlorine (hypochlorous acid), ozone and active oxygen can also kill microorganisms caught on the surfaces of the carbon fibers 11 and 12 and present in the for-treatment water.

(5) Another Third Treating Step

In place of application of an alternating voltage to the carbon fibers 11 and 12 (in the third treating step of the above (4)), the for-treatment water and the carbon fibers 11 and 12 may be heated by means of an electric heater 9. In this case, the controller 17 energizes (or applies an alternating voltage to) the electric heater 9 so as to cause the heater 9 to generate heat which in turn heats the carbon fibers 11 and 12 and the for-treatment water.

In this case as well, temperatures of the carbon fibers 11 and 12 and the for-treatment water are increased to least about +50° C. to about +70° C. (+50° C. to +100° C.). Due to the increase in temperature caused by the heat generation, even microorganisms with reduced heat resistance which have stuck to the carbon fibers 11 and 12 in the first treating step and managed to survive the second treating step can be killed efficiently in this alternative third treating step. Since the for-treatment water has been electrolyzed in the foregoing second treating step so as to decrease or increase the pH of the for-treatment water, even microorganisms which can usually endure a temperature of up to about +80° C. can be killed at a low temperatures from about +50° C. to about +70° C.

At this time, due to the heat generation of the electric heater 9, air bubbles are produced in a space below the carbon fibers 12 in the case 7. Since these air bubbles cannot pass through the carbon fibers 8 easily, presence of the air bubbles remaining in the space below the carbon fibers 12 in the case 7 eventually interferes with treatment of the for-treatment water. For this reason, while energizing the electric heater 9, the controller 17 operates the pump 6 so as to carry the bubbles below the carbon fibers 12 to above the carbon fibers 11 together with a small amount of the for-treatment water (as shown in FIG. 1). The carried bubbles are then discharged from the outlet 4.

Thereby, an inconvenience that the bubbles produced by the heat generation of the electric heater 9 are accumulated in the case 7 can be obviated. The controller 17 controls energization of the electric heater 9 based on an output from the temperature sensor 23. Further, the pump 6 can be operated continuously or intermittently during the energization of the electric heater 9. Alternatively, independently of the energization of the electric heater 9, the pump 6 may be operated continuously or intermittently in this alternative third treating step. Further, the pump 6 may be controlled based on an increase in temperature of the for-treatment water (carbon fibers 12) which is detected by the temperature sensor 23.

Further, in this alternative third treating step, in addition to the heat generation of the electric heater 9, an alternating voltage may be applied between the carbon fibers 11 and 12 so as to cause the for-treatment water and the carbon fibers 11 and 12 to generate heat, as in the third treating step of the above (4). According to the constitution, the temperature of the for-treatment water (carbon fibers 11 and 12) in the third treating step can be increased rapidly, and the effect of treating the microorganisms can be improved.

Then, after killing the microorganisms in the third treating step, the controller 17 performs the fourth treating step.

(5) Fourth Treating Step

In the fourth treating step, the controller 17 opens the bypass valve 20A and the drainage valve 21A with the valve 16 and the water flow valve 22 being closed, after completion of the third treating step. Thereby, for-treatment water from the feed water system 14 flows into the case 7 from the outlet 4, flows through the case 7, flows out from the inlet 2, and is discharged to the drain ditch through the drain pipe 21. Consequently, the carbon fibers 11 and 12 can be restored to their original microorganism-free, clean states, whereby the carbon fibers 11 and 12 can be kept sanitary and clean.

(6) Electrolyte Regeneration Treatment

The carbon fibers 11 and 12 are subjected to electrolyte regeneration treatment periodically (for example, after the fourth treating step is performed a few times). The electrolyte regeneration treatment is performed before or during the forth treating step. In this electrolyte regeneration treatment, the controller 17 applies a positive potential to one of the carbon fibers 11 and the carbon fibers 12 and a negative potential to the other so as to cause electrolysis and increases the potentials to a level at which the surfaces of the carbon fibers 11 and 12 are eluted into the for-treatment water.

Thereby, the surfaces of the carbon fibers 11 and 12 whose abilities to catch and hold microorganisms have been degraded by residual microorganisms on the surfaces are eluted into the for-treatment water and removed, and new surfaces are exposed so as to regenerate the abilities to catch and hold microorganisms.

As described above, microorganisms stuck to the carbon fibers 11 and 12 are killed in the second and third treating steps, and in the fourth treating step, for-treatment water is caused to flow into the treating apparatus 1 from the outlet 4 and drained via the drain pipe 21 which is connected between the inlet 2 and the valve 16. Thereby, killed microorganisms remaining on the carbon fibers 11 and 12 can be washed out and drained to the drain ditch. Further, since the foregoing treatment of regenerating the surfaces of the carbon fibers is also carried out, a good effect of catching and holding microorganisms by the carbon fibers 11 and 12 can be reproduced next time the first treating step is carried out.

(7) Hydroponics System

Figure 5:
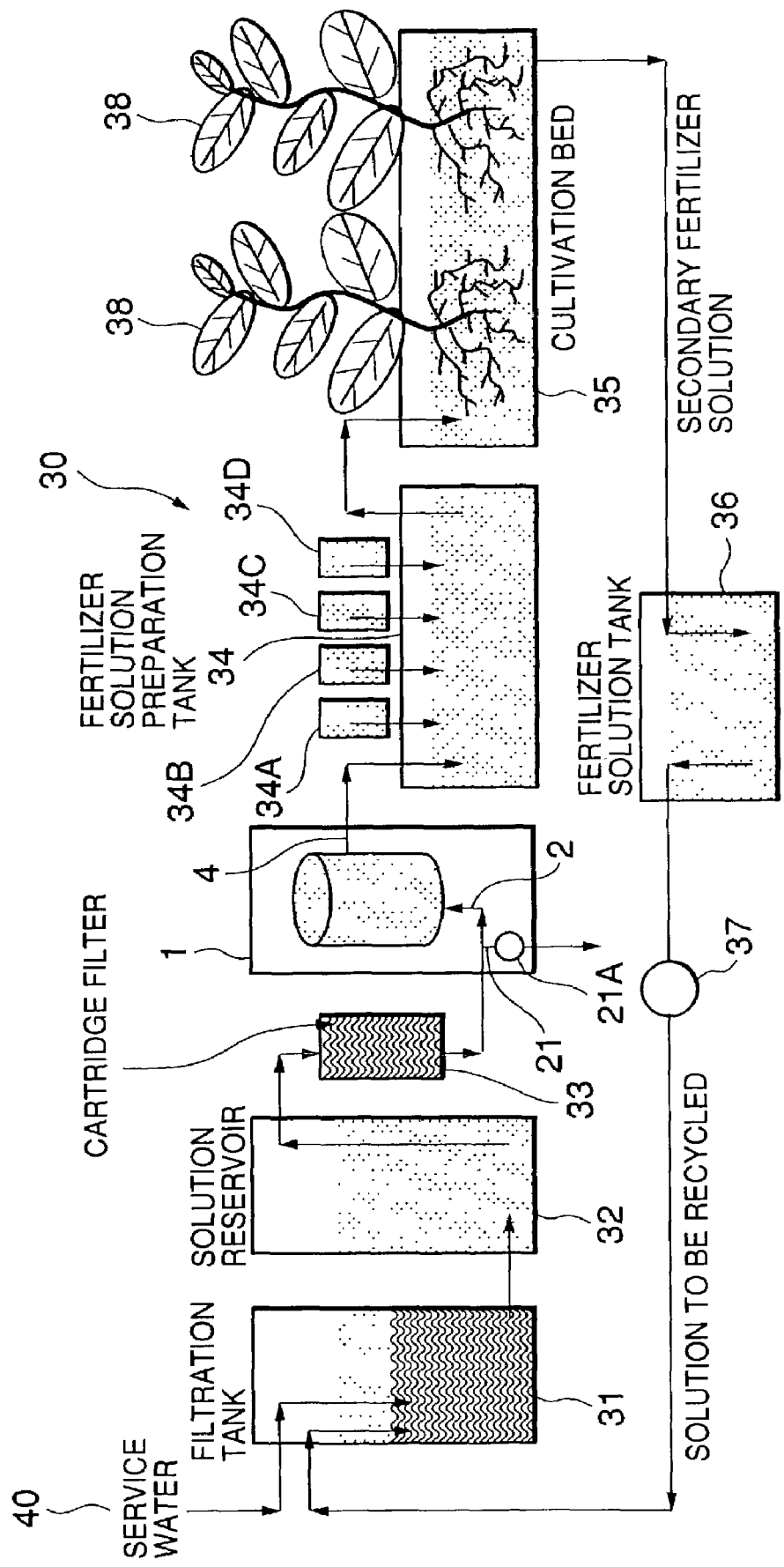
FIG. 5 is a diagram illustrating a hydroponics system using the water treating apparatus of FIG. 1.

Next, an embodiment of a hydroponics system 30 which has the water treating apparatus 1 of the present invention incorporated therein will be described with reference to FIG. 5. In FIG. 5, a secondary fertilizer solution (which is a fertilizer solution nutrients of which have been absorbed and decreased by plants in a cultivation bed 35) which is reserved in a fertilizer solution tank 36 is sent to a filtration tank 31 which contains activated carbon by a circulation pump 37 so as to remove impurities such as organic matter. Thereafter, the resulting solution flows into a solution reservoir 32 to be reserved temporarily. The fertilizer solution (for-treatment water) reserved in the solution reservoir 32 then flows into a cartridge filter 33 which comprises a bobbin filter or the like so as to remove impurities which have not been removed in the filtration tank 31. Then, the resulting solution flows into the water treating apparatus 1 from the inlet 2.

Then, bacteria proliferating in the fertilizer solution which has flown into the water treating apparatus 1, particularly Fusariums or other bacteria (hereinafter referred to as "pathogenic bacteria") which damage roots of crops 38 as plants in the cultivation bed 35 are adsorbed on the carbon fibers 11 and 12 in the foregoing first treating step, and only the fertilizer solution from which the pathogenic bacteria have been removed flows into a fertilizer solution preparation tank 34 from the outlet 4 of the water treating apparatus 1. Then, when the second treating step (electrolysis) is carried out, for example, once in a day with the valve 16 and the water flow valve 22 closed, the pathogenic bacteria adsorbed on the carbon fibers 11 and 12 undergo metabolic disorder due to the aforementioned displacement of the pH of the fertilizer solution from the optimal pH of the pathogenic bacteria, whereby proliferation capability and heat resistance of the pathogenic bacteria are significantly degraded.

After the proliferation capability and heat resistance of the pathogenic bacteria are significantly degraded due to the electrolysis of the fertilizer solution as described above, the third treating step in which an alternating voltage is applied between the carbon fibers 11 and 12 and/or the electric heater 9 is heated is carried out. Due to the application of the alternating voltage or heat generated by the heater 9, the temperature of the fertilizer solution in the case 7 increases, and the pathogenic bacteria are heated accordingly. Thereby, the pathogenic bacteria which have undergone the metabolic disorder are killed.

Then, after completion of the third treating step, the bypass valve 20A and the drainage valve 21A in the water treating apparatus 1 are opened to discharge the killed pathogenic bacteria remaining on the carbon fibers 11 and 12 to the drain ditch through the drain pipe 21, so that the carbon fibers 11 and 12 are washed to be clean. Reference numeral 40 denotes service water (in this case, tap water or underground water is used as the service water). Since the fertilizer solution circulating through a circulation path is decreased due to absorption into the crops 38 or natural evaporation, a decreased amount of the fertilizer solution is replenished with the service water 40.

Further, when the fertilizer solution in the cultivation bed 35 lacks certain kinds of nutrients which are necessary for growth of the crops 38 planted in the cultivation bed 35, the insufficient nutrients are selected from fertilizer adjusting devices 34A, 34B, 34C and 34D (in this case, magnesium (Mg), iron (Fe), manganese (Mn), copper (Cu) and other fertilizers (nutrients) which are assumed to be apt be insufficient for growing the crops 38 are independently reserved in the fertilizer adjusting devices 34A, 34B, 34C, and 34D) and charged into the fertilizer solution preparation tank 34.

Thereby, the fertilizer solution in the fertilizer solution preparation tank 34 is adjusted to be a fertilizer solution containing nutrients suitable for growing the crops 38 planted in the cultivation bed 35. Then, the fertilizer solution having the nutrients adjusted to be suitable for growing the crops 38 flows from the fertilizer solution preparation tank 34 into the cultivation bed 35 in which the corps 38 are planted, and a predetermined amount of the fertilizer solution is absorbed by the crops 38. Then, the secondary fertilizer solution having a reduced amount of the nutrients is discharged from the cultivation bed 35, put back to the fertilizer solution reservoir 36, sent out by the circulation pump 37 again, and re-circulates as a recycled solution.

Thus, since the water treating apparatus 1 of the present invention is disposed in the path to re-circulate a secondary fertilizer solution discharged from the cultivation bed 35 through the cultivation bed 35, the optimal pH of pathogenic bacteria contained in a fertilizer solution which circulates through the path in which a fertilizer solution and a secondary fertilizer solution flow can be significantly displaced, and the pathogenic bacteria can be heated. Thereby, pathogenic bacteria existing in a circulation path in the cultivation bed 35 are caused to undergo metabolic disorder, and the pathogenic bacteria which have undergone the metabolic disorder can be killed by heating.

Further, by carrying out the foregoing first treating step, decreases in concentrations of trace amounts of nutritional elements such as manganese and iron contained in the fertilizer solution can be suppressed. Thereby, iron and manganese deficiencies of the crops 38 being cultivated in the cultivation bed 35 can be prevented. In addition, deleterious effects of toxic substances which are liable to remain or accumulate in crops 38 when a conventional bactericide is used, on the crops 38 themselves or humans and livestock that have eaten the crops 38 can be inhibited. On the whole, the effect of eliminating pathogenic bacteria in the circulation path can be significantly improved, and clean and sanitary crops 38 can be cultivated accordingly.

Further, in the embodiment, the polarities of the potentials applied to the carbon fibers 11 and 12 are switched at an interval of 2 seconds to 1 minute in the first treating step. It is not limited to the particular interval. The polarities may be switched at a much longer interval (such as a day or a month) so as to adsorb negatively charged microorganisms and positively charged microorganisms on the carbon fibers 11 and 12.

Further, in the embodiment, although only a pair of carbon fibers 11 and 12 are provided in the case 7, more carbon fibers may be provided. For example, it is also effective that a total of three carbon fibers are provided and a potential applied to the middle carbon fibers and a potential applied to the left and right carbon fibers are switched at a predetermined interval.

Further, in the first embodiment, the water treating apparatus 1 is disposed in the water channel such as a water pipe from the solution reservoir. Alternatively, the water treating apparatus 1 may be disposed directly in the solution reservoir. It is also effective to dispose the apparatus 1 in the waste water channel. In addition, although the carbon fibers are used as the conductive material in the embodiment, it may be any conductive material as long as it is capable of collecting microorganisms.

Further, in the embodiment, microorganisms collected and killed on the carbon fibers 11 and 12 are discharged from the inlet 2 to the drain pipe 21 connected between the inlet 2 and the valve 16 by injecting for-treatment water into the water treating apparatus 1 from the outlet 4. Alternatively, the carbon fibers 11 and 12 may be cleaned by injecting for-treatment water from the inlet 2 and discharging the for-treatment water from the outlet 4.

Further, in the latter embodiment, the water treating apparatus 1 of the present invention is disposed between the cartridge filter 33 and fertilizer solution preparation tank 34 of the hydroponics system 30. Alternatively, the water treating apparatus 1 may be disposed anywhere in a circulation path through which a fertilizer solution and a secondary fertilizer solution circulate. In addition, although the water treating apparatus 1 is disposed at only one location in the hydroponics system 30 in the embodiment, the present invention is also effective even when the water treating apparatus 1 is disposed at two or more locations in the circulation path through which a fertilizer solution and a secondary fertilizer solution circulate.

Further, although the water treating apparatus of the present invention is applied to the hydroponics system in the embodiment, it may also be applied to a fish hatchery for sea fish or freshwater fish so as to kill saprophytic bacteria or microorganisms in sea water or fresh water.

As described in detail above, according to the present invention, microorganisms contained in for-treatment water are collected by a pair of conductive materials. To be more specific, negatively charged microorganisms are attracted to a positively charged conductive material, and positively charged microorganisms are attracted to a negatively charged conductive material. Thereby, the microorganisms contained in the for-treatment water can be adsorbed on the conductive materials smoothly and efficiently so as to sterilize the for-treatment water.

Further, according to the present invention, the polarities of potentials applied to the conductive materials are switched at an interval of 2 seconds to 1 minute. Thus, trace amounts of nutritional elements such as manganese and iron contained in the for-treatment water can be prevented from precipitating by switching between the polarities of the potentials applied to the conductive materials before the nutritional elements are oxidized or the nutritional elements can be reduced by switching between the polarities of the potentials applied to the conductive materials in the initial stage of oxidization. Thereby, an inconvenience that the trace amounts of nutritional elements are removed from the for-treatment water can be eliminated or inhibited, and the for-treatment water becomes very suitable for a hydroponics system.

Further, according to the present invention, firstly, in a first treating step, microorganisms in for-treatment water flowing through a water channel are adsorbed on a pair of conductive materials as in the foregoing invention. Then, in a second treating step, flow of the for-treatment water is stopped, and with a positive potential being applied to one of the conductive materials and a negative potential being applied to the other conductive material, the potentials applied to the conductive materials are increased so as to cause electrolysis of the for-treatment water. As a result, the pH of a portion of the for-treatment water in the vicinity of the surface of the one conductive material is decreased, thereby making the portion of the for-treatment water acidic. Meanwhile, the pH of a portion of the for-treatment water in the vicinity of the surface of the other conductive material is increased, thereby making the portion of the for-treatment water alkaline. Thus, the pHs of portions of the for-treatment water which surround microorganisms caught on the conductive materials can be displaced significantly from the optimal pH of the microorganisms. In addition, hypochlorous acid is also produced on the surface of one of the conductive materials at the same time.

Since the microorganisms metabolize with enzyme, they undergo metabolic disorder in the for-treatment water whose pH is off their optimal pH, whereby proliferation capability and heat resistance of the microorganisms are significantly degraded. Thereby, it becomes possible to kill the microorganisms with a smaller increase in temperature. In addition, sterilization by hypochlorous acid occurs to a certain extent in the second treating step.

Then, in a third treating step, an alternating voltage is applied between the conductive materials, whereby the for-treatment water generates heat. Due to an increase in temperature caused by the heat generation, the microorganisms stuck to the conductive materials and suffering from metabolic disorder due to displacement of the pH of the for-treatment water from the optimal pH of the microorganisms are killed. Thus, according to the present invention, when the pH of for-treatment water such as water intended for drinking and cooking or waste water can be significantly displaced from the optimal pH of microorganisms contained in the for-treatment water, the microorganisms can be caught on the conductive materials and killed efficiently with a small increase in temperature, and an effect of removing the microorganisms in the for-treatment water can be improved significantly.

Further, according to the present invention, the polarities of potentials applied to the conductive materials are switched at an interval of 2 seconds to 1 minute. Thus, as in the case of the foregoing invention, trace amounts of nutritional elements such as manganese and iron contained in the for-treatment water can be prevented from precipitating by switching between the polarities of the potentials of the conductive materials before the nutritional elements are oxidized or the nutritional elements can be reduced by switching between the polarities of the potentials of the conductive materials in the initial stage of oxidization. Thereby, an inconvenience that the trace amounts of nutritional elements are removed from the for-treatment water can be eliminated or inhibited, and the for-treatment water becomes very suitable for a hydroponics system.

Further, according to the present invention, in the foregoing third treating step, the for-treatment water is heated by means of a heater. Therefore, in addition to the alternating voltage applied between the conductive materials, the for-treatment water is also heated by means of the heater, so that the temperature of the for-treatment water increases quickly. Thereby, it becomes possible to kill the microorganisms stuck to the conductive materials more quickly and more effectively.

Further, according to the present invention, in the foregoing third treating step, chlorine and/or ozone are/is produced at one of the conductive materials, and active oxygen is produced at the other conductive material. Thereby, in the third treating step, microorganisms can also be killed by chlorine and/or ozone produced at a positively charged conductive material by electrolysis and active oxygen produced at a negatively charged conductive material by the electrolysis.

Further, according to the present invention, firstly, in a first treating step, microorganisms in for-treatment water flowing in a water channel are adsorbed on a pair of conductive materials as in the foregoing invention. Then, in a second treating step, flow of the for-treatment water is stopped, and with a positive potential being applied to one of the conductive materials and a negative potential being applied to the other conductive material, the potentials applied to the conductive materials are increased so as to carry out electrolysis of the for-treatment water. As a result, the pH of a portion of the for-treatment water in the vicinity of the surface of the one conductive material is decreased, thereby making the portion of the for-treatment water acidic. Meanwhile, the pH of a portion of the for-treatment water in the vicinity of the surface of the other conductive material is increased, thereby making the portion of the for-treatment water alkaline. Thus, the pHs of portions of the for-treatment water which surround microorganisms caught on the conductive materials can be displaced significantly from the optimal pH of the microorganisms. In addition, hypochlorous acid is also produced on the surface of one of the conductive materials at the same time.

Since the microorganisms metabolize with enzyme, they undergo metabolic disorder in the for-treatment water whose pH is off their optimal pH, whereby proliferation capability and heat resistance of the microorganisms are significantly degraded. Thereby, it becomes possible to kill the microorganisms with a smaller increase in temperature. In addition, sterilization by hypochlorous acid occurs to a certain extent in the second treating step.

Then, in a third treating step, the for-treatment water is heated by means of a heater. Due to an increase in temperature of the for-treatment water caused by the heating, the microorganisms stuck to the conductive materials and suffering from metabolic disorder due to displacement of the pH of the for-treatment water from the optimal pH of the microorganisms are killed. Thus, according to the present invention, when the pH of for-treatment water such as water intended for drinking and cooking or waste water can be significantly displaced from the optimal pH of microorganisms contained in the for-treatment water, the microorganisms can be caught on the conductive materials and killed efficiently with a small increase in temperature, and an effect of removing the microorganisms in the for-treatment water can be improved significantly.

Further, according to the present invention, one of the conductive materials is positioned over the other conductive material, the heater is disposed in a portion underneath the lower conductive material where the for-treatment water flows in. Thereby, heating of the for-treatment water by the heater is conducted smoothly. In addition, from the portion where the heater is disposed to a portion over the upper conductive material where the for-treatment water flows out, a bypassing path which allows the for-treatment water to bypass the conductive materials is provided. Thereby, air bubbles produced in the space below the lower conductive material due to the heat generation of the heater can be carried to above the upper conductive material through the bypassing path and then discharged. Consequently, an inconvenience that the bubbles are accumulated below the lower conductive material and interfere with the treatment of the for-treatment water can be avoided.

Further, according to the present invention, a pump for carrying the for-treatment water from below to above the conductive materials is provided in the bypassing path, and the controller operates the pump in the foregoing third treating step. Thereby, air bubbles produced below the conductive materials while the heater generates heat can be smoothly carried to above the conductive materials and discharged.

Further, according to the present invention, the lower conductive material is inclined such that the angle of the bottom of the conductive material increases toward an inlet of the bypassing path. Thereby, air bubbles produced below the conductive material can enter the bypassing path easily, and the bubbles can be dealt with more smoothly.

Further, according to the present invention, after completion of the third treating step, killed microorganisms remaining on the conductive materials can be washed out. In this case, since the for-treatment water in which the conductive materials are immersed is discharged, the microorganisms stuck to the conductive materials can be removed easily by running water. Thereby, the conductive materials can be kept clean.

Further, according to the present invention, the conductive materials are porous materials. Thereby, an effect of collecting microorganisms can be improved significantly.

Further, according to the present invention, the conductive materials comprise carbon fibers. As a result, the effect of collecting the microorganisms in the first treating step and the effect of displacing the pH of the for-treatment water from the optimal pH of the microorganisms by electrolysis in the second treating step can be improved.

Further, according to the present invention, the carbon fibers constituting the conductive materials have a noble metal such as palladium, platinum, iridium, tantalum or gold or an oxide or mixture thereof incorporated therein. Thus, deterioration of the conductive materials comprising the carbon fibers is inhibited so as to achieve a long useful life of the conductive materials, and hypochlorous acid can be produced efficiently.

Further, according to the present invention, adsorbability reproducing treatment in which the surfaces of the conductive materials are eluted into the for-treatment water by electrolysis is carried out. Thereby, when microorganism adsorbing abilities of the surfaces of the conductive materials are weakened, the microorganism adsorbing abilities can be restored by carrying out the adsorbability reproducing treatment so as to elute the surfaces of the conductive materials by electrolysis.

Further, according to the present invention, a fertilizer solution is supplied to a cultivation bed so as to cultivate plants, a path for recirculating a secondary fertilizer solution discharged from the cultivation bed through the cultivation bed, and the water treating apparatus of the foregoing invention is disposed in the path. Consequently, pathogenic bacteria existing in the circulation path in the cultivation bed can be killed securely by significantly displacing the optimal pH of the pathogenic bacteria to cause them to undergo metabolic disorder and then heating the pathogenic bacteria.

Thereby, as compared with conventional heat sterilization of a fertilizer solution, for example, a large amount of energy is not required. Therefore, the pathogenic bacteria in the cultivation bed can be significantly decreased with a small amount of energy, and a significant degree of energy conservation can be achieved accordingly. Further, deleterious effects of toxic substances which may remain or accumulate in plants when a bactericide is used, on the plants themselves and humans and livestock that have eaten the plants can be obviated. As a result, it becomes possible to cultivate clean and sanitary plants.

Further, according to the present invention, as described above, a reduction in concentration of trace mounts of nutritional elements such as manganese and iron contained in a fertilizer solution can be prevented or suppressed, and an inconvenience that plants cultivated in the cultivation bed suffer from manganese and iron deficiencies can be prevented.

What is claimed is:

1. A water treating apparatus which comprises:
a casing having an inlet located at a lower end and an outlet located at an upper end;
at least a pair of porous conductive materials being located inside the casing; a first conductive material being located near the inlet and a second conductive material being located near the outlet;
a porous insulator being centrally located inside the casing, and separating the conductive materials;
a heater being located inside and near the lower end of the casing in a portion underneath the first conductive material where for-treatment water flows in the inlet;
a pH adjuster being located near the inlet; and
a controller being located externally to the casing;
wherein the controller controls the application of potentials of opposite polarities to the conductive materials, and reverses the polarities of the potentials at predetermined time intervals so as to adsorb the microorganisms on the conductive materials; the controller controls the pH adjuster; the controller controls the heater; the heater heats the for-treatment water and the conductive materials; the pH adjuster adjusts the pH of the for-treatment water between pH 2 and pH 11 so that the heat resistance of microorganisms is degraded.

2. The apparatus of claim 1, wherein the controller switches between the polarities of the potentials applied to the conductive materials at a time interval of 2 seconds to 1 minute.

3. The apparatus of claim 1, wherein the controller switches between the polarities of the potentials applied to the conductive materials at a time interval of 2 seconds to 1 minute in the first treating step.

4. The apparatus of claim 1, further comprising a bypassing path connected externally to the casing; the bypassing path having two ends; a first end of the bypassing path being connected to the lower end of the casing and below the first conductive material; a second end of the bypassing path being connected to the upper end of the casing and above the second conductive material;
wherein the bypassing path transports for-treatment water from the lower end of the casing to the upper end of the casing so that the for-treatment water bypasses the conductive materials.

5. The apparatus of claim 4, further comprising a pump; the pump being located in the bypassing path for carrying the for-treatment water from the lower end of the casing and below the first conductive material to the upper end of the casing and above the second conductive material;
wherein the controller controls the pump.

6. The apparatus of claim 4 or 5, wherein the casing is inclined approximately 30 degrees from a vertical axis toward an inlet of the bypassing path.

7. The apparatus of claim 1, wherein the conductive materials are porous materials.

8. The apparatus of claim 1, wherein the conductive materials comprise carbon fibers.

9. The apparatus of claim 8, wherein the carbon fibers constituting the conductive materials contain a noble metal such as palladium, platinum, iridium, tantalum or gold, an oxide thereof or a mixture thereof.

* * * * *